United States Patent [19]

Hohnstein et al.

[11] Patent Number: 4,673,835
[45] Date of Patent: Jun. 16, 1987

[54] STATOR CORE HAVING WAVED LAMINATIONS

[75] Inventors: Dean H. Hohnstein; John S. Jandovitz; Kalman N. Lehoczky, all of Bradenton, Fla.

[73] Assignee: Siemens Energy and Automation, Inc., Atlanta, Ga.

[21] Appl. No.: 865,068

[22] Filed: May 19, 1986

[51] Int. Cl.⁴ .................. H02K 5/04; H02K 15/14
[52] U.S. Cl. .................. 310/217; 310/259; 310/65
[58] Field of Search ............... 310/65, 216, 217, 218, 310/254, 259, 42, 89, 91, 56, 60 R, 61

[56] References Cited

U.S. PATENT DOCUMENTS

| 538,344 | 4/1895 | Penn et al. | 310/217 |
| 798,222 | 8/1905 | Siegfried | 310/65 |
| 4,542,313 | 9/1985 | Di Pietro | 310/65 |

Primary Examiner—Patrick R. Salce
Assistant Examiner—D. L. Rebsch
Attorney, Agent, or Firm—Volker R. Ulbrich

[57] ABSTRACT

A stator core for an electrical machine has laminations with a wave-shaped surface. The waves in the stator laminations in the cold core causes the tangential heat expansion of the core to be distributed over a number of the waves which increases each wave height only slightly. This prevents the system from reaching a stability limit or permanent deformation.

4 Claims, 4 Drawing Figures

STATOR CORE HAVING WAVED LAMINATIONS

BACKGROUND OF THE INVENTION

This invention relates to electrical machines such as motors and hydrogenerators which have a stator core and a stator frame with a heat expansion difference between the core and frame, and more particularly, to a bulb generator which has a stator frame in direct contact with surrounding cold water.

During operation, the laminated stator core of electrical machines is always warmer than the supporting stator frame. This heat causes the core to expand radially more than the stator frame. The expansion difference causes high radial shrink forces which compress the core. The radial shrink forces lead to high tangential stresses. When these stresses exceed the stability limit of the core lamination, the core experiences buckling, which distorts the core lamination. FIG. 1 graphically illustrates the connection between the relative tangential deformation X of the core due to shrink forces and the tangential compression stresses S in the core lamination. Starting from zero tangential shortening—equivalent to zero temperature difference between the core and frame—the tangential stress increases rapidly to the stability limit SL. A further increase of temperature difference causes the lamination to break out perpendicular to the lamination which is called "buckling". Such buckling may happen in one or more places around the circumference of the core. The buckling manifests itself as a distortion in the lamination in the magnitude of about 0.25 to 1.0 inch and with a length of about 5 to 20 inches. The position of the buckling in the circumference is usually arbitrary.

Other parts of the circumference seem to be completely healthy. A further increase of temperature and tangential shortening to XM causes only a slight rise of the tangential stress because the buckling distortion accumulates in the tangentially expanded lamination. Reduction of the temperature will reduce the tangential stress to zero. However, the buckling deformation containing a certain amount of plastic deformation will not disappear. The residual deformation XR remains as permanant damage of the stator core lamination. It will be appreciated that it would be highly desirable to provide a lamination which is not susceptible to buckling.

In one arrangement designed to prevent buckling, the stator core lamination is supported by dovetail bars with spring connection to the frame. The expanding stator core lamination compresses the spring which reduces the shrink forces and the tangential stresses. A disadvantage of this configuration is that it is quite expensive because of the springs. Sometimes several hundred springs are needed to provide an even core support. In addition the springs, together with the core, act as a complex vibration system excited by the magnetic forces.

In another arrangement, the stator core has a certain gap relative to the frame. The development of the shrink forces are postponed because the heat expansion difference has to fill the radial gap prior to the build-up of the radial forces. The disadvantage of this approach is a lack of control with regard to the radial bending of the core relative to the frame. Vibrations and uneven magnetic pull between the rotor and parts of the stator core could occur.

In another approach, layers of the stator core lamination are glued to each other. This method could be used on both axial ends of the core or over a few inches of axial length or over the whole axial length. The many layers of glue will reduce the magnetic axial length of the core and reduce the efficiency. The glueing of each lamination is quite expensive both in material and labor. In addition, this method is limited to small and medium-sized machines. Accordingly, it would be appreciated that it would be highly desirable to provide a simple, inexpensive structure to prevent buckling of the core lamination.

Accordingly, it is an object of the present invention to provide a stator core structure which resists buckling.

Another object of the present invention is to provide a core lamination which resists buckling.

Another object of the invention is to provide a laminated core structure which resists buckling and is simple and inexpensive.

SUMMARY OF THE INVENTION

Briefly stated, in accordance with one aspect of the present invention, the foregoing objects are achieved by providing a stator core having a wave-shaped surface. The existence of the waves in the stator laminations in the cold core causes the tangential heat expansion of the core to be distributed over a number of the waves, which increases each wave height by a very small amount. This prevents the system from reaching a stability limit or permanent deformation.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENTS

Figure 3:
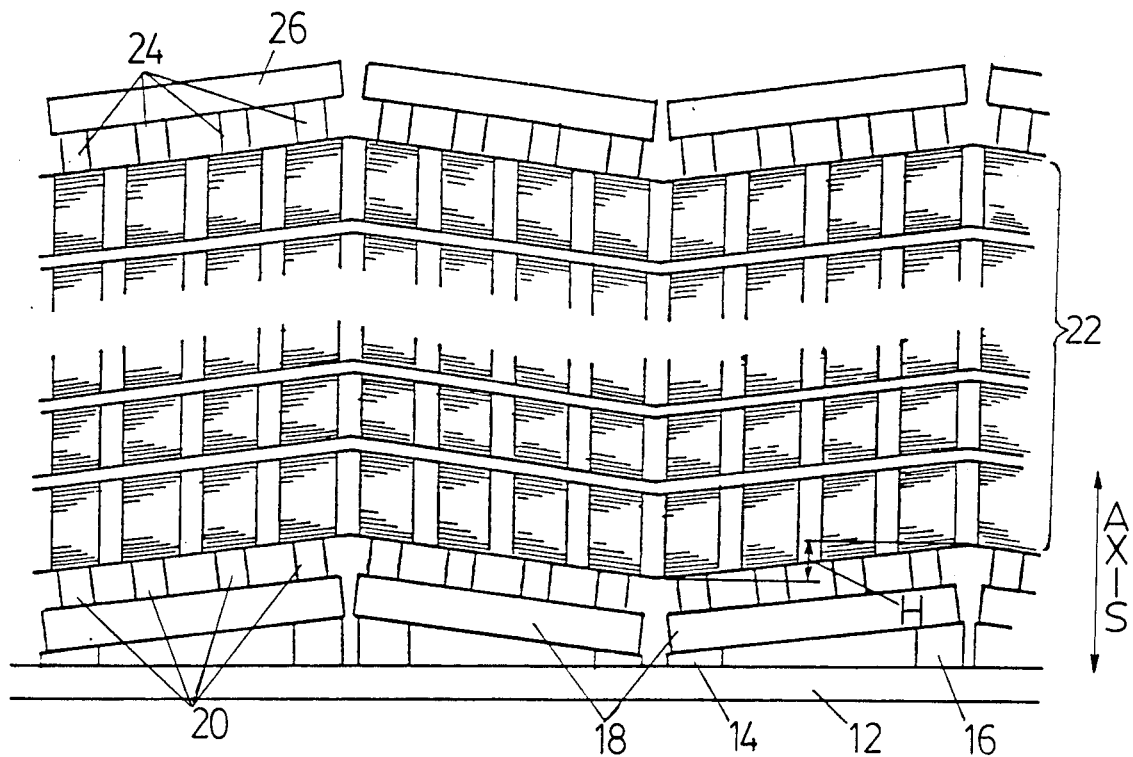
FIG. 3 is a diagrammatic view of a portion of a stator core illustrating the wave-shaped core laminations in accordance with the present invention.

Referring to FIG. 3, a stator is shown for an electrical machine which has an axis of rotation. For a bulb generator, the orientation of the axis would be rotated 90 degrees from the position shown in FIGS. 3 and 4 to account for the horizontal orientation of the bulb generator. The stator contains a base plate 12 which is oriented perpendicular to the axis of rotation of the bulb generator. The base plate 12 may be part of the stator frame. The base plate 12 supports first and second spacer blocks 14 and 16 which have unequal heights. The unequal heights of the spacer blocks 14 and 16 provide a tilted support for press plate 18. The press plate 18 is preferably tilted at an angle of about 0.2 to 3.0 degrees. The angle will vary according to the expected temperature difference and diameter of the core. A small expected temperature difference requires only a small angle. A large diameter requires a larger angle than a small diameter.

Supported on the press plate 18 are press fingers 20, which are preferably of equal heights. Although the press fingers 20 are of equal heights, a tilted surface is obtained because of the slope of the press plate 18.

The basic wave structure is introduced by changing the sequence of spacer blocks 14 and 16. FIG. 3 shows a somewhat exaggerated wave height H for illustrative purposes. The wave height H is preferably between about one-sixteenth to about one-half inch as measured over a horizontal span of about twenty to thirty inches.

Core laminations 22 are stacked upon the press fingers 20 in the usual manner but providing the desired wave shape. The wave shape is obtained or maintained by positioning two first spacer blocks 14 adjacent one another and positioning two second spacer blocks 16 adjacent one another but having the adjacent blocks supporting different press plates 18. As an alternative, the two adjacent spacer blocks may be replaced by a single spacer block having a surface configured for supporting the press plates. The surface contour can be nearly flat, depending upon the diameter of the machine and the expected temperature difference. As with the wave height H, the slope of the press plate is also exaggerated in the drawings.

On the opposite end of the core stacking the press fingers 24 and press plates 26 will follow the wave shape of the outermost layers of the core. The tilting of the press plates 26 can be controlled in the same manner as the press plates 18 on the other end of the core stacking.

Figure 4:
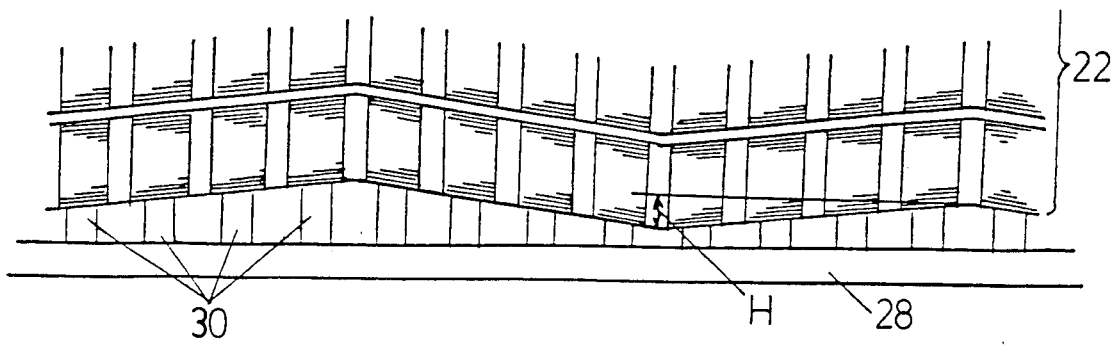
FIG. 4 is a view similar to FIG. 3 but illustrating a different embodiment.

Referring to FIG. 4, a very practical way of arranging the waves is shown. The base plate 28 supports press fingers 30 by systematically changing height, thereby introducing the desired wave shape of laminations 32. Thus, the wave shape is obtained by having press fingers 30 of non-uniform varying heights instead of using the spacer blocks and press plate as illustrated in the embodiment of FIG. 3.

Figure 1:
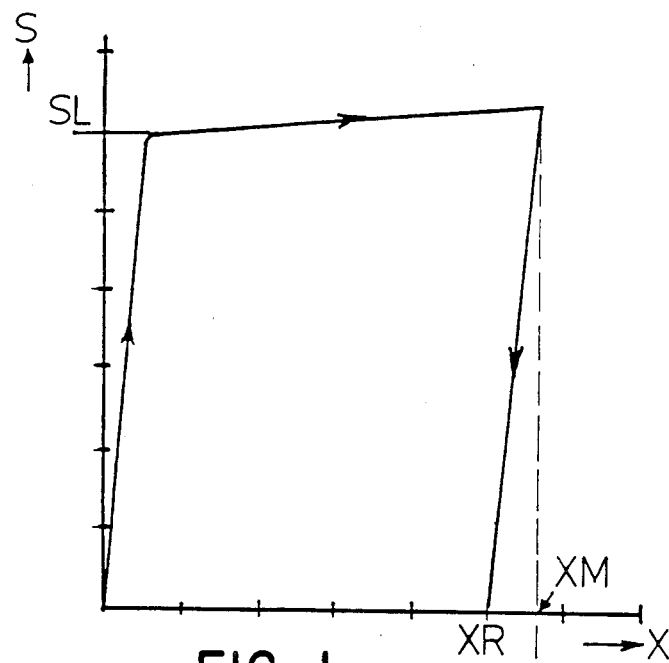
FIG. 1 graphically illustrates the relationship between relative tangential deformation and the tangential compression stress for prior art configurations.
Figure 2:
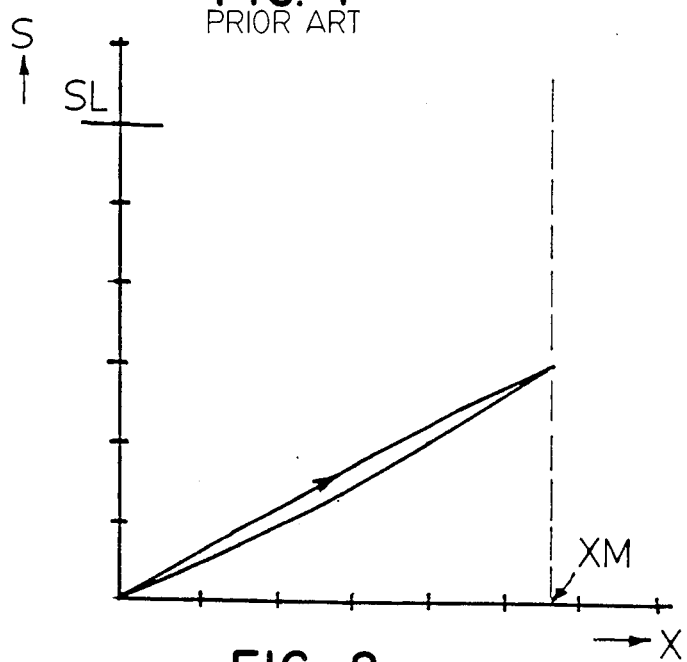
FIG. 2 graphically illustrates the relationship between the relative tangential deformation and the tangential compressive stress for the stator core made in accordance with the present invention.

Operation of the invention is best explained in conjunction with FIG. 2 which explains the connection between the relative tangential deformation of the core X due to the temperature and the tangential stresses S. Starting from zero temperature and deformation, the tangential stress increases much slower than without waves. The maximal tangential deformation XM still does not lead to stability limit or plastic deformation. If the temperature difference between the core and the frame is reduced to zero, the core will move back to the starting position. Considering the fact that the tangential stresses are less than without waves, the radial stresses between core and frame will also be reduced.

In prior bulb type generators, there was a large heat expansion difference between the stator core and the stator frame due to the fact that the stator frame is submerged in cold water. The present invention prevents buckling of the core laminations by providing stator core laminations which are stacked in axial waves covering a part or the whole circumference of the core. The existence of the waves in the cold core causes the tangential heat expansion of the core to be distributed over a large number of waves, thereby increasing each wave height by a very small amount, thereby preventing the core from reaching a stability limit or permanent deformation.

As will be evident from the foregoing description, certain aspects of the invention are not limited to the particular details of the examples illustrated, and it is therefore contemplated that other modifications or applications will occur to those skilled in the art. For example, the wave may be based on a sequence of three press plates with the first one tilted left, the second one horizontal, and the third one tilted to the right. Similarly, the invention covers solutions where the waves have flat tops or where the slope of the wave consists of more than one angle. Also, the present invention does not require the use of glue to hold the laminations together or the use of springs as radial supports. It is accordingly intended that the claims shall cover all such modifications and applications as do not depart from the true spirit and script of the invention.

What is claimed as new and desired to be secured by Letters Patent of the United States is:

1. An electrical machine stator having an axis of rotation comprising a core having a lamination with a wave-shaped surface and a serpentine edge, a base plate oriented perpendicular to the axis and a plurality of press fingers of different heights positioned on the base plate supporting the lamination and maintaining the wave shape of the surface of the lamination.

2. An electrical machine stator having an axis of rotation comprising a core having a lamination with a wave-shaped surface and a serpentine edge, a base plate oriented perpendicular to the axis of rotation, at least two spacer blocks of different heights positioned on the base plate, and a press plate positioned on the spacer blocks maintaining the wave shape of the surface of the lamination.

3. A stator according to claim 2, including a plurality of press fingers positioned on the press plate supporting the lamination and maintaining the wave shape of the surface of the lamination.

4. An electrical machine stator having an axis of rotation comprising a core having a lamination with a wave-shaped surface and a serpentine edge, a base plate oriented perpendicular to the axis of rotation, at least first, second and third spacer blocks positioned on the base plate, a first press plate positioned on the first and second spacer blocks and a second press plate positioned on the second and third spacer blocks, said first and second press plates abutting said lamination and maintaining the wave shape of the surface of the lamination.

* * * * *